Oct. 20, 1953 R. B. KINZBACH 2,655,935
PRESSURE RELIEF VALVE ASSEMBLY
Filed Dec. 26, 1946 3 Sheets-Sheet 1

Inventor
Robert B. Kinzbach
By E. J. Hardway
Attorney

Patented Oct. 20, 1953

2,655,935

UNITED STATES PATENT OFFICE 2,655,935

PRESSURE RELIEF VALVE ASSEMBLY

Robert B. Kinzbach, Houston, Tex.

Application December 26, 1946, Serial No. 718,313

14 Claims. (Cl. 137—538)

This invention relates to a pressure relief valve assembly.

An object of the present invention is to provide a relief valve, specially designed for pumps wherein the pressure resisting the opening movement of the valve decreases as the valve moves toward open position and increases as the valve moves toward closed position.

It is another object of the present invention to provide a relief valve assembly which includes a valve and a yieldable means acting against the valve which is of such construction that the pressure thereof resisting the opening of the valve will decrease substantially in proportion to the decrease in the fluid pressure against the valve and on closing movement of the valve the pressure will increase with the closing movement of the valve.

It is another object of the present invention to provide a valve assembly of the character described wherein the valve will move quickly to fully open or fully closed position without hesitation or vibration in intermediate positions.

A further object of the present invention resides in the provision of a relief valve specially designed for high stage pumps in a compounded arrangement so that the high stage pump relief will be in harmony with the pressure differential across the high stage pump only.

It is another object of the present invention to provide a valve assembly wherein the valve will move instantaneously from fully closed to fully opened position upon the application of pre-determined pressure against the valve to open it.

With the above and other objects in view the invention has particular relation to certain novel features of construction, operation and arrangement of parts, an example of which is given in this specification and illustrated in the accompanying drawings, wherein.

Figures 1, 2, 3:
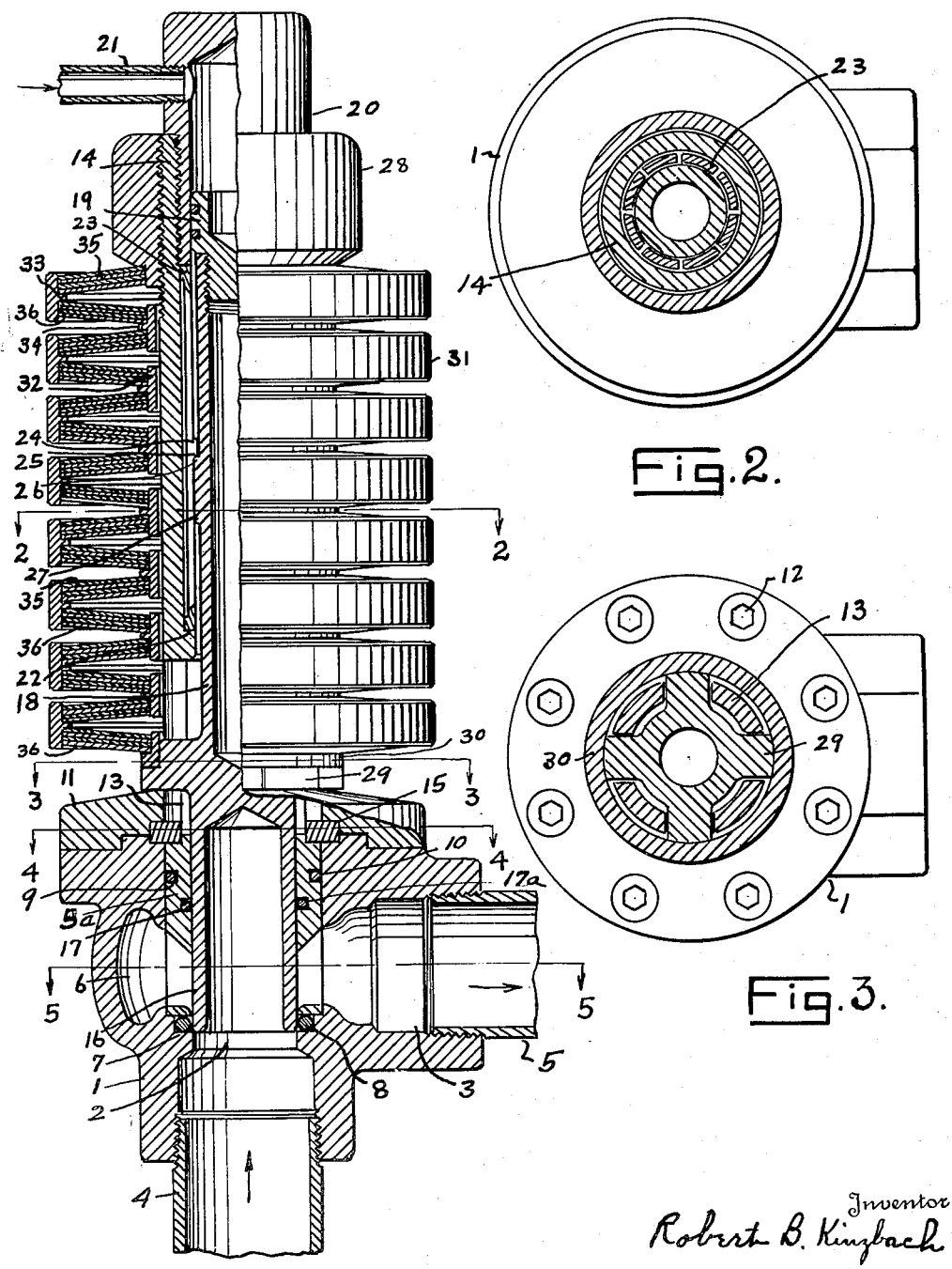
Figure 1 is a side elevation of the assembly, partly in section.
Figure 2 is a cross-sectional view taken on the line 2—2 of Figure 1.
Figure 3 is a cross-sectional view taken on the line 3—3 of Figure 1.
Figure 4:
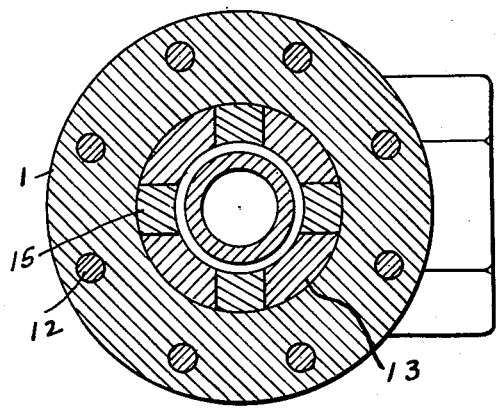
Figure 4 is a cross-sectional view taken on the line 4—4 of Figure 1.
Figure 5:
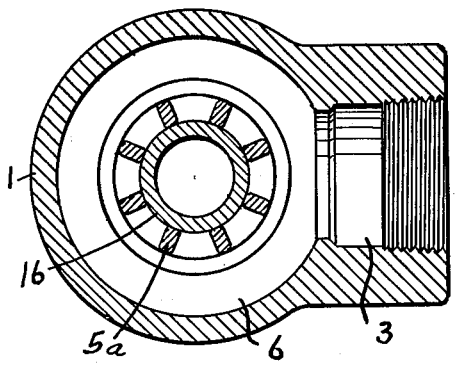
Figure 5 is a cross-sectional view taken on the line 5—5 of Figure 1.

Referring now more particularly to the drawings, wherein like numerals of reference designate the same parts in each of the figures, the numeral 1 designates the valve body which is provided with an inlet port 2 and an outlet port 3.

In the present illustration there is an inlet line 4 through which pressure fluid is delivered to the inlet 2 and a discharge line 5 leading from the outlet 3.

The interior of the valve body is shown as being cylindrical in shape and fitted within it there is the valve cage 5a which is slitted opposite the outlet 3 and the inside of the valve body, opposite the slitted portion of the cage, is formed with an annular channel 6 which merges into said outlet.

The inlet end of the body is internally reduced in diameter forming an annular shoulder 7 and suitable packing such as an O-ring 8, is located between said shoulder and the opposing end of the cage 5a. The end of the cage 5a, opposite the shoulder 7 has a loose fit with the body, to permit leakage from the inlet port 2 into the annular channel 6 for a purpose to be hereinafter stated.

Said cage may also have an external annular groove 9 to receive packing, such as an O-ring 10, to form a seal between the cage and the valve body on the opposite side of the channel 6 from the seal 8.

There is a body cap 11 fitted, and suitably secured to, the end of the body opposite the inlet end thereof. This cap may be secured to the body in any preferred manner as by the bolts 12.

There is a tubular housing 14, one end of which is provided with spaced legs 13. The free ends of these legs are outwardly thickened forming flanges which are clamped between the body cap 11 and the adjacent end of the body and countersunk into said cap and also countersunk into the adjacent end of the body and cage 5a there are the filler blocks 15 which are fitted between said legs 13.

Working in the valve cage there is a hollow piston-type valve 16 which works through the packing ring 8 when the valve is in closed position, that is in position to close the discharge line leading from the valve body. On the opposite side of the annular channel 6 there is a packing, preferably an O-ring 17, which is seated in an internal annular groove 17a in the valve cage and which surrounds the valve and forms a fluid tight joint therewith. Upon opening movement of the valve 16 leakage will be permitted, past the O-ring 8, and past the adjacent end of the cage 5a into the channel 6 so as to balance the pressures on opposite sides of the O-ring 8 to prevent it from becoming unseated from the seat. In other words, as the valve 16 moves past the O-ring 8 toward its open position fluid will leak through the annular space between said valve and the corresponding end of the cage 5a. Due to the pressure drop at this point of leakage the O-ring 8 will be drawn toward this point to effect a seal and upon continued movement of the valve toward open position there would be a tendency to displace said O-ring from its seat between the shoulder 7 and the opposing end of the cage 5a. However, leakage channels between the cage 5a and the body 1 and leading from the port 2 into the annular channel 6 would create a similar condition at this, the outer side of said O-ring 8 which would balance the inward and upward pull incident to said pressure drop above referred to. Consequently a restraining force is applied to prevent the unseating of the O-ring 8 from its seat.

Outstanding from the valve 16 there is a tubular stem 18 which works axially through the housing 14.

In the form illustrated in Figure 1, there is shown a suitable compensating piston 19 attached to the outer end of the stem 18 and which works in the low stage cylinder 20 provided with the inlet line 21. This piston, under some working conditions of the valve assembly, may be dispensed with as will be hereinafter explained.

This cylinder may be screwed into, or otherwise secured to, the outer end of the housing 14 and clamped between the inner end of said cylinder and an internal annular shoulder 22 in the housing 14 there is shown an outwardly expansible detention sleeve 23 through which the stem 18 works axially.

This detention sleeve has the spaced longitudinal slits thus providing for its expansion. It is also provided with the inside outwardly and inwardly facing shoulders 24 and 25 arranged approximately midway between the ends thereof and the stem 18 has the spaced external shoulders 26 and 27, said shoulder 26 being arranged to engage the shoulders 25 to detain the valve in close position and the shoulder 27 being arranged to engage the shoulders 24 to detain the valve in open position. While the detention sleeve is shown and described it is to be understood that it is not indispensible and the assembly will operate successfully without it.

Screwed onto the outer end of the housing 14 there is an adjusting nut 28 and on the stem 18 adjacent the valve 16 there are the radial lugs 29 and around these lugs and countersunk therein there is an annular spring ledge 30.

Yieldable means is provided to normally hold the valve closed but to yield to allow the valve to open when the pressure of the high stage pump exceeds a predetermined limit. The yieldable means referred to is of such construction that as the valve opens the resisting pressure decreases substantially in proportion to the decrease in the fluid pressure against the valve and as the valve moves toward closed position the actuating force of said means increases with the closing movement of the valve. As a result the valve moves rapidly to fully open or to fully closed position without hesitation or vibration while in intermediate position.

As illustrated there is a series of annular outer spring retainers 31 and a series of annular inner retainers 32 arranged in staggered relation with respect to the retainers 31, all arranged around the housing 14.

The retainers 31 have the inside annular ribs 33 intermediate their ends and the inner retainers have the external annular ribs 34 intermediate their ends.

Within each outer retainer 31 there are the outer and inner series of nested plate-like springs 35 and 36, one series diverging inwardly with respect to the other series. They are arranged on opposite sides of the corresponding inside ribs 33 with their outer margins fitting against the outer spring retainers 31 and with their inner margins resting against the corresponding inner retainers 32 on opposite sides of the ribs 34 of the inner retainers, excepting the extreme outer series of springs 35 rest against the nut 28 and the extreme inner series of springs 36 rest against the ledge 30. The plate-like springs of these series are of a slightly frusto-conical form. It is to be noted that the ends of the retainers 32 extend beyond the corresponding series of springs 35, 36 which rest against them so that said retainers 32 will contact before the series of nested plate-like springs 35, 36 come into parallel relation.

Figure 6:
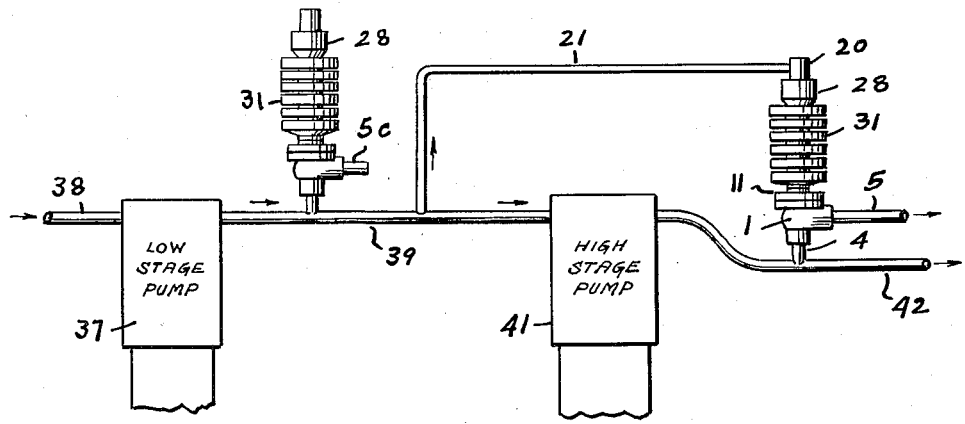
Figure 6 is a diagrammatical view of a compounded pump arrangement showing the relief valve incorporated therein.

Referring to Figure 6 there is shown a low stage pump 37 having an intake pipe 38 and a discharge pipe 39. Connected into the pipe 39 there is a pressure relief valve assembly for relieving the low stage pump and substantially similar to that hereinabove described excepting that its outer end is closed and its discharge line 5c is open to the atmosphere and the piston 19 omitted.

The discharge pipe 39 of the low stage pump forms the intake line of the high stage pump 41 and the pump 41 has a discharge line 42 into which the valve inlet line 4 is connected. The line 21 which is connected, at one end, into the low stage cylinder 20 is connected, at its other end, into the low stage pump discharge line 39.

During the normal operation of the pumps 37, 41 the relief valve 16 will remain closed. Should the pressure differential between the suction and discharge of the high stage pump exceed a predetermined limit the excess pressure against the valve 16 and its stem 18 will cause expansion of the detention sleeve 23 allowing the shoulder 26 to pass by the opposing shoulder 25 and the construction of the spring assembly, as herein described, is such that its resistance to the valve movement will decrease, substantially, in proportion to the decrease of the pressure against the valve 16 thus allowing the valve to quickly open. In view of the fact that the suction pressure of the high stage pump through the line 21 is combined with the applied pressure of the springs to balance the discharge pressure of said pump this high stage pump will be relieved at a predetermined differential pressure applied through the springs.

When the valve 16 reaches its fully opened position the shoulder 27 of the valve stem 18 will engage the shoulder 24 of the detention sleeve 23 thus detaining the valve 16 in open position.

Upon a reduction of the pressure of the liquid discharged by the high stage pump the spring assembly, hereinabove described, assisted by the pressure of the fluid in the low stage cylinder 20 will overcome the resistance of detention sleeve 23 and return the valve 16 toward closed position and the actuating force of said spring assembly will increase thus causing a quick movement of the valve to fully closed position.

Figure 7:
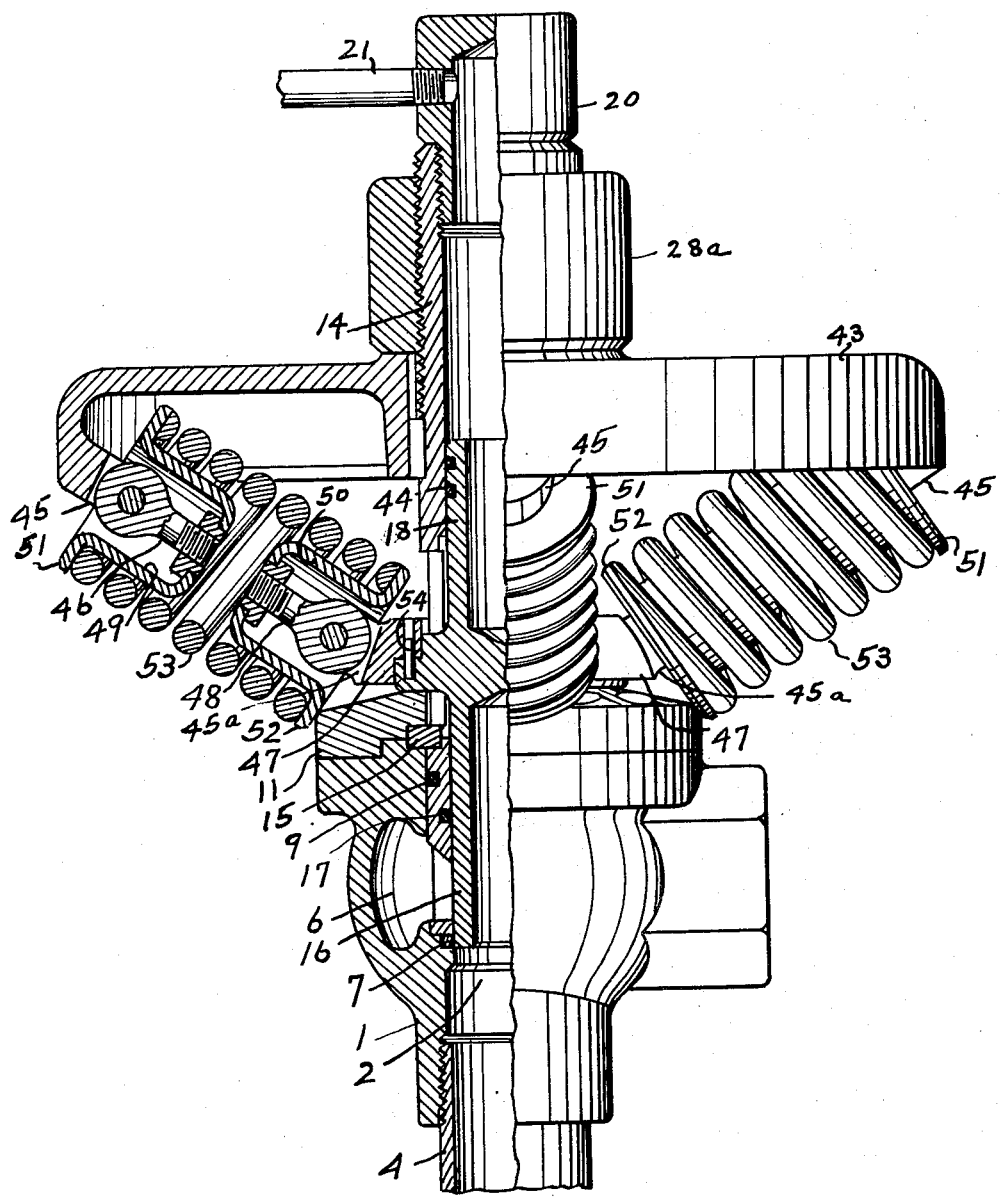
Figure 7 is a side view, partly in section, of another embodiment of the invention.

It is to be understood that the form of the spring assembly, for controlling the movements of the valve, as shown in Figures 1 and 6, is illustrative merely and that any type of valve controlling means wherein the pressure against the valve decreases approximately in proportion to the decrease in the fluid pressure against the valve, upon opening movement of the valve, and which increases with the closing movement of the valve, may be employed. For example, as illustrated in Figure 7, splined onto the housing 14 there is a hood-like spring cover 43 which abuts the inner end of the adjusting nut 28a which is threaded onto the outer end of the housing 14. In this form of the invention the detention sleeve 23 is dispensed with and the outer end of the stem 18 fits closely within the housing 14 and is sealed therewith by means of the seal rings 44.

Mounted on the stem 18 there is a ring 47 which is provided with spaced lugs 45a therearound and the downwardly turned rim of the spring cover 43 is provided with lugs 45 arranged opposite the lugs 45a. As illustrated there are four pairs of these lugs spaced a uniform distance apart.

Pivotally connected to the respective lugs 45 there are the inwardly extending pins 46 and pivotally connected to the lugs 45a there are the pins 48 and mounted on the adjacent ends of these pins 46, 48 are the cup shaped spring perches 49 and 50, respectively, which are spaced apart. The remote ends of these spring perches are provided with the outwardly extending annular flanges 51 and 52 and between these flanges, of each pair, and surrounding the spring perches are the strong coil compression springs 53. The ring 47 is pinned to the stem 18 by suitable dowel pin, as 54.

In other respects the embodiment of the relief valve assembly, illustrated in Figure 7, is the same as that shown in Figure 1, and the operation of the two forms of the assembly is substantially the same.

The drawings and description are illustrative merely while the broad principle of the invention will be defined by the appended claims.

What I claim is:

1. A relief valve assembly comprising, a body having an inside annular packing groove and also a pressure fluid inlet and outlet, a cage fitted into the body and arranged to form one side of said groove, said cage having egress ports to permit the passage of fluid to the outlet, a valve mounted in the body, a packing ring in the groove and in sealed engagement with the valve, when the valve is in one position, said cage forming with said body a leakage passageway leading from said groove into said outlet for causing the fluid to retain the packing ring within the body when the valve moves out of sealed engagement with the ring.

2. A pressure relief valve assembly comprising, a body having a fluid pressure inlet and outlet, a valve slidably mounted in the body, a main packing element between the valve and body, a valve restraining mechanism adjustable for valve opening pressure and so constructed that the restraining pressure of said mechanism on the valve will decrease progressively as the valve moves toward open position and will increase progressively as the valve moves toward closed position said restraining mechanism including yieldable means arranged in angular relation to the axial line of movement of the valve, and detention means mounted on the body and releasably engageable with the valve to detain the valve in closed position, said detention means being releasable upon initial opening movement of the valve to reduce the force opposing opening movement of the valve.

3. A pressure relief valve assembly comprising, a body having a pressure fluid inlet and outlet, a valve mounted in the body to control said inlet and outlet, a main packing element in the body arranged to seal about the valve, when the valve is in one position, a valve restraining mechanism including yieldable means extending radially from the body in angular relation to the line of axial movement of the valve and arranged to hold the valve in closed position within said body but constructed to allow the valve to open upon application of a predetermined fluid pressure to the valve through the inlet opening said valve restraining mechanism being effective to resist movement of the valve toward open position with a progressively decreasing restraining force, and detention means mounted on the body and releasably engageable with the valve to detain the valve in closed position, said detention means being releasable upon initial opening movement of the valve to reduce the force opposing opening movement of the valve.

4. A pressure relief valve assembly comprising, a valve body having an inside annular packing groove and also having a fluid pressure inlet opening and a fluid pressure outlet opening, a cage fitted into the body and arranged to form one side of said groove said cage having egress ports to permit the passage of fluid to the outlet opening, a valve mounted in said body, means for positively limiting the movement of the valve within the body, a main packing element in said groove for forming a seal between the body and valve, said cage forming with said body a passageway leading from said groove into said outlet opening for allowing leakage of fluid past said element upon inward displacement of the element whereby points of low pressure are created by said leakage to cause the packing element to be restrained within the groove as the valve moves out of engagement with said element.

5. A pressure relief valve assembly comprising, a body having a pressure fluid inlet and a pressure fluid outlet, a valve mounted within the body said body having an annular packing groove, a cage fitted into the body and arranged to form one side of said groove said cage having egress ports to permit the passage of fluid to the outlet port, auxiliary packing elements on the cage arranged to prevent leakage of fluid past the cage and body, yieldable elements arranged to be deflected by the pressure of the fluid entering the inlet against the valve and of such construction that the resistance thereof will decrease as the deflection thereof increases throughout its range of travel said yieldable means being mounted to maintain the valve in closed position but to allow the valve to open when the pressure of the fluid entering the inlet exceeds a predetermined pressure and means for varying the resistance of said yieldable means.

6. A pressure relief valve assembly comprising, a body having a pressure fluid inlet port and a pressure fluid outlet port, a valve mounted in the body, means for limiting the valve movement, a main packing element in the body on one side of said ports in sealing relation with the valve when the valve is in closed position, means effective to prevent leakage past the valve on the other side of said ports, a spring assembly composed of separate units arranged in angular relation to the axial line of movement of the valve and means connected with the body and the valve, respectively, for containing said units said containing means being adjustable to apply compression to said units whereby additional compression applied by the movement of the valve toward open position will encounter a decreasing resistance from said springs means for confining the total deflection to a predetermined range of spring characteristics, and detention means in said containing means and releasably engageable with the valve for detaining the valve in closed position, said detention means being releasable upon initial opening movement of the valve to cause a drop in the force opposing opening movement of the valve.

7. A pressure relief valve assembly comprising, a body having an inlet port and an outlet port, a valve mounted within the body, means for limiting the range of movement of the valve, a main packing element forming a seal between the valve and body when the valve is in position to close said inlet, spring means arranged to oppose opening movement of the valve in response to fluid pressure through the inlet, said spring means being effective to offer a variable restraining pressure commensurate with said spring means characteristics as the valve changes position in said body, means for applying the pressure of a fluid to a predetermined area to oppose the pressure exerted through the inlet against the valve and effective to augment the pressure of the spring means which tends to hold the valve closed.

8. A relief valve assembly comprising, a body having an inlet and an outlet, a valve mounted within said body, means for limiting the movement of said valve, a main packing element arranged to seal between the valve and body when the valve is closed, yieldable means arranged in angular relation to the axial line of movement of the valve opposing opening movement of the valve and detention means detaining opening movement of the valve but releasable upon initial movement of the valve to decrease the restraining force opposing the valve movement.

9. A relief valve assembly comprising, a body having an inlet port and a relief port, a valve mounted in the body and movable to positions to close or open said ports, means including a series of yieldable elements arranged in angular relation to the axial line of movement of the valve and normally holding the valve closed but yieldable to allow, with progressively decreasing resistance, the opening of the valve under the influence of the pressure of fluid through the inlet port said means being operable to apply a progressively increasing force to the valve as the valve moves toward closed position, and detention means mounted on the body and releasably engageable with the valve to detain the valve in closed position, said detention means being releasable upon initial opening movement of the valve to reduce the force opposing opening movement of the valve.

10. A relief valve assembly comprising, a body having an inlet port and a relief port, a valve mounted in the body and movable to positions to close or open said ports, means including a series of yieldable elements arranged in angular relation to the axial line of movement of the valve and normally holding the valve closed but yieldable to allow, with progressively decreasing resistance, the opening of the valve under the influence of the pressure of fluid through the inlet port said means being operable to apply a progressively increasing force to the valve as the valve moves toward closed position and means for limiting the range of valve movement and detention means mounted on the body and releasably engageable with the valve to detain the valve in closed position, said detention means being releasable upon initial opening movement of the valve to reduce the force opposing opening movement of the valve.

11. A relief valve assembly comprising, a body having an inlet port and a relief port, a valve mounted in the body and movable to positions to close or open said ports, means normally holding the valve closed but yieldable to allow, with decreasing resistance, the opening of the valve under the influence of the pressure of fluid through the inlet port said means including a series of coil springs arranged in angular relation to the line of axial movement of the valve and being operable to apply a progressively increasing force to the valve as the valve moves toward closed position, and detention means for detaining the valve in opened or closed position, said detention means being releasable, upon initial movement of the valve, effective to cause a proportionate instantaneous drop in the force opposing opening movement of the valve.

12. A pressure relief valve assembly comprising, a body having a fluid inlet and a fluid outlet, a valve mounted within the body and movable to positions to close and open the inlet and outlet and exposed to fluid pressure tending to open the valve when the valve is in closed position, sealing means within the body adapted to seal the valve in closed position, means tending to hold the valve in closed position, a stem on the valve, an expansible detention sleeve within the body around the stem, interengaging means between the sleeve and stem arranged to hold the valve closed but releasable under the influence of an increase of said pressure to disengage said interengaging means to permit the valve to open and means for limiting the opening movement of the valve.

13. A pressure relief valve assembly comprising, a body having a fluid inlet and a fluid outlet, a valve mounted within the body and movable to positions to close and open the inlet and outlet and exposed to fluid pressure tending to open the valve when the valve is in closed position, sealing means within the body adapted to seal the valve when in closed position, means tending to hold the valve in closed position, a stem on the valve having an external frusto-conical face, a detention sleeve in fixed relation with the valve body and having an inside face engageable with said stem face to hold the valve in closed position, said sleeve being expansible under the influence of the pressure thrust against the valve to permit release of said interengaging faces to thereby instantaneously release the valve to permit the pressure thereagainst to move the valve into open position and means for limting the opening movement of the valve.

14. A pressure relief valve assembly comprising, a body having a fluid inlet and a fluid outlet, a valve mounted within the body and movable to positions to close and open the inlet and outlet and being exposed to fluid pressure tending to open the valve when the valve is in closed position, sealing means within the body adapted to seal the valve in closed position, a series of coil springs arranged in angular relation to the axial line of movement of the valve and connected at their inner ends to the valve and at their outer ends to anchoring means on the body said springs normally tending to hold the valve closed but which resist the opening movement of the valve with progressively decreasing force.

ROBERT B. KINZBACH.

References Cited in the file of this patent

UNITED STATES PATENTS

| Number | Name | Date |
|---|---|---|
| 126,982 | Pallett | May 21, 1872 |
| 306,568 | Wilder | Oct. 14, 1884 |
| 449,161 | Lacy | Mar. 31, 1891 |
| 823,278 | Hoxie | June 12, 1906 |
| 930,033 | Bither | Aug. 3, 1909 |
| 1,730,330 | Meserue | Oct. 1, 1929 |
| 1,770,912 | Clapp | July 22, 1930 |
| 1,826,597 | Brecht | Oct. 6, 1931 |
| 1,833,218 | Kelsey | Nov. 24, 1931 |
| 2,170,530 | Johnson | Aug. 22, 1939 |
| 2,263,107 | Smirl | Nov. 18, 1941 |
| 2,268,807 | Curtis | Jan. 6, 1942 |
| 2,294,609 | Schlosser | Sept. 1, 1942 |
| 2,299,079 | Davis | Oct. 20, 1942 |
| 2,320,763 | Trautman | June 1, 1943 |
| 2,325,193 | Nutt | July 27, 1943 |
| 2,332,630 | Fawkes | Oct. 26, 1943 |
| 2,360,733 | Smith | Oct. 17, 1944 |
| 2,547,882 | Norton | Apr. 3, 1951 |
| 2,573,761 | Firth | Nov. 6, 1951 |